W. E. BOCK.
POWER TRANSMISSION MECHANISM.
APPLICATION FILED JUNE 5, 1920.
1,416,163.
Patented May 16, 1922.
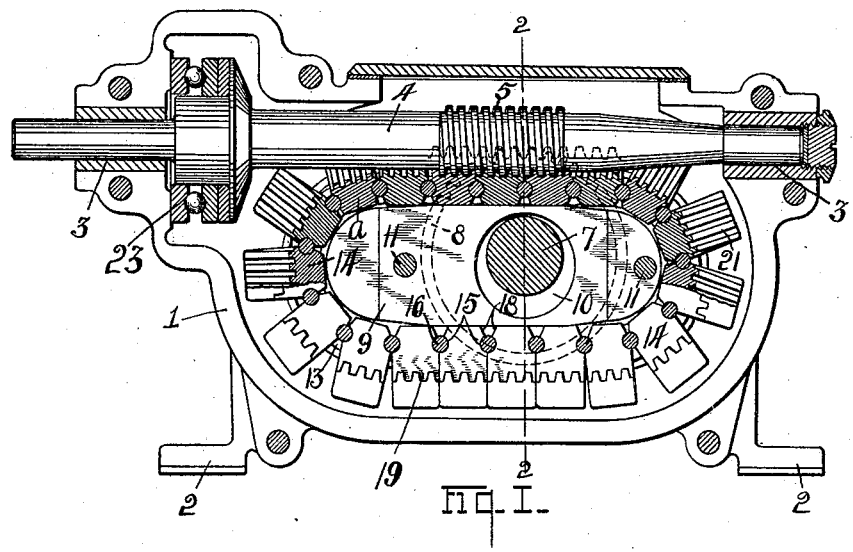
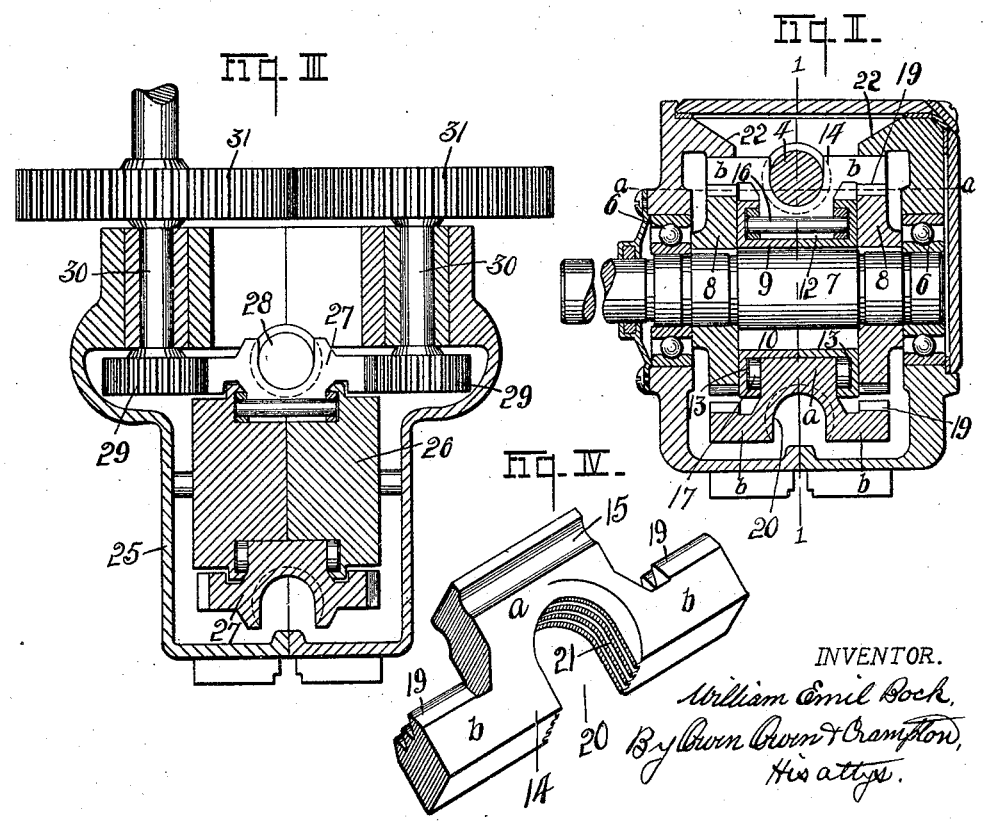
INVENTOR.
William Emil Bock,
By Owen Owen & Crampton,
His attys.

UNITED STATES PATENT OFFICE.

WILLIAM EMIL BOCK, OF EAGLE POINT COLONY, OHIO, ASSIGNOR TO BERTHA M. BOCK, OF EAGLE POINT COLONY, OHIO.

POWER-TRANSMISSION MECHANISM.

1,416,163. Specification of Letters Patent. Patented May 16, 1922.

Application filed June 5, 1920. Serial No. 386,673.

*To all whom it may concern:*

Be it known that I, WILLIAM EMIL BOCK, a citizen of the United States, and a resident of Eagle Point Colony, in the county of Lucas and State of Ohio, have made an invention appertaining to Power-Transmission Mechanism; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to power transmission mechanisms of the type employing a worm as the driving member, and has for its primary object to enhance the efficiency and commercial value of mechanisms of this class by the provision of simple and improved means intermediate the worm and driven shafts whereby it is possible to distribute the driving force of the work throughout as many teeth thereof as desired to suit the power and load conditions, thereby relieving the teeth of a worm and its meshing driven member from the enormous strain to which subjected when under heavy load when a few teeth only thereof are in engagement, as in the case of the customary worm and worm-wheel drive.

A further object of the invention is the provision, in combination with a worm of a power transmission mechanism, of a driven worm member of endless chain form, the links or sections of which, during a predetermined portion of their travel, mesh with the drive worm and have a pushing as distinguished from a pulling force applied thereto in transmitting the power from the worm to the driven means.

A further object of the invention is the provision in a mechanism of the class described of spaced driven members at opposite sides of the drive worm and of means in mesh with both the worm and driven members, with the center of the line of force of the worm, transversely of its axis, applied to the means in the line of applied force thereof on the driven member, whereby the full driving tendency of the worm is transmitted to the driven parts.

Further objects and advantages of the invention will be apparent from the following detailed description of the invention.

While the invention in its broader aspect is capable of embodiment in numerous forms, two only of such forms are illustrated in the accompanying drawings, in which,—

Figure 1 is a central vertical section of a mechanism embodying the invention taken on the line 1—1 in Fig. 2, with parts in full. Fig. 2 is a cross-section on the line 2—2 in Fig. 1. Fig. 3 is a cross-section, similar to that of Fig. 2, of a slightly modified form of the invention, and Fig. 4 is an enlarged perspective view of one of the chain members.

Referring to the drawings, 1 designates a case or housing adapted to contain oil or grease for lubricating purposes and provided with supporting feet 2 at its bottom, if desired to mount the same on a supporting base. The case is provided in its opposite ends with axially aligned bearings 3, 3 for a drive shaft 4 having a worm 5 within the case. The case also has axially aligned bearings 6, 6 in its opposite sides for a driven shaft 7, which, in the present instance, is disposed below the worm 5 and may extend in either or both directions from the case. A pair of spur-gears 8, 8 are keyed in spaced relation on the shaft 7, one at each side of the worm shaft, and are of suitable size for the pitch line of their teeth at a predetermined point on the gears, to intersect a predetermined portion of the worm 5, as hereinafter described.

A core or frame 9 is fixedly mounted within the case 1 between the gears 8, 8, having an opening 10 loosely receiving the shaft 7. This core is elongated lengthwise of the worm shaft and is fixed to the case by bolts 11, or in any other suitable manner. A groove 12 is provided entirely around the perimeter of the core lengthwise thereof and has its side walls each undercut to form endless raceways 13, 13 therein.

A chain or endless set of blocks 14 is guided for movement by the core 9 and is intended to traverse the groove 12 therein and to transmit power from the worm 5 to the gear wheels 8, 8. These blocks, in the present instance, are of T-form with the ends of their leg portions *a* projecting into the groove and provided at their front and rear sides adjacent to their ends with transversely extending circular recesses 15, each forming a bearing for the adjacent side of a pivot pin 16, one of which is disposed between each two blocks of the chain. These pins project at their ends beyond the blocks and carry rolls 17 within the wall raceways 13 of the groove. The blocks cooperate to fill the groove, being in abutment one with the other and have their inner end edges chamfered from the recess edges 15, as at 18, to permit relative pivotal movements of the blocks on the pins 16 when traversing the ends or curved portions of the groove. It is thus evident that the blocks are retained in the groove by the pins 16, which are in turn held therein by the rolls 17 traveling in the wall grooves 13.

Each arm $b$, $b$ of a block 14 is provided at its inner side with a rack section 19 for engagement with the teeth of the gear 8 at the respective side of the worm 5 so that a movement of the block across the gear in engagement therewith will drive the gear. When the blocks 14 are traversing a straight portion of their movement and are in flat abutment one with another the rack sections 19 of several blocks cooperate to form a rack of predetermined length.

Each block 14 is provided in its outer side midway between the arms $b$, $b$ with a cross channel or recess 20 for receiving the shaft 4 and its worm 5 when the blocks are traversing the side of the core 9 adjacent to the worm, and this channel is provided in its walls with threads 21 for engagement with the worm. The depth of engagement of the worm in each block is such that the center of engagement of the worm with the block registers with the pitch line of the gear teeth at their points of engagement with the rack sections 19, as indicated by the line $a$, $a$ in Fig. 2. This is important for a practical and satisfactory operation of the mechanism, as the center line of contact of the drive member with the blocks 14 is in register with the pitch or center line of engagement of the block racks with the gears, thereby preventing any tendency of the blocks to rock in transmitting the force from the worm to the gears.

The blocks 14 at the point of engagement of the gears 8, 8 with their rack sections 19 are preferably engaged at the outer sides of their arms by thrust arms 22 projecting from the respective sides of the case. These thrust arms oppose the outward thrust of the gear teeth on the blocks. The worm shaft, when driven forward, has its end thrust opposed by an end thrust bearing 23 in the case.

It is evident that the worm may be of suitable length to engage with one or a plurality of plugs 14 at the same time so that the force applied may be distributed throughout any desired number of threads on the worm, thereby proportionally lessening the strain on any one thread; that each block has an encompassing engagement with the worm so that each worm convolution has a prolonged area of engagement with the coacting block thread; that in either direction of turning of the worm the block sections in engagement therewith impart a pushing instead of a pulling action on the other blocks of the set, so that no strains tending to pull the blocks apart are set up in the set; that the worm is disposed between the driven gears, and that the center plane of the line of force applied by the worm to the blocks is in the pitch line plane of the meshing teeth of the block racks and gear teeth.

In the form of the invention illustrated in Fig. 3, the axis of the driven gears instead of being transverse to the plane of movement of the chain or block set are in planes parallel thereto with the peripheries of the gears facing each other at opposite sides of the worm. In this form 25 designates the case or housing; 26 the core forming the chain guide; 27 the chain blocks or sections; 28 the worm shaft for driving engagement with the blocks; 29, 29 a pair of gears in mesh with the rack teeth at the opposite ends of the blocks when in engagement with the worm; 30, 30 shafts carrying the gears 29 and journaled in the case, and 31, 31 a pair of gears carried by and connecting the shafts 30, 30. One of the shafts 30 is longer than the other and serves as the driven shaft of the mechanism. With this mechanism the longitudinal centers of the rack teeth of the blocks 27 should align substantially with the center of engagement of the worm with the blocks.

It is found in practice that a mechanism embodying the invention is not only highly efficient in its action in transmitting power from a worm shaft to a driven shaft but is also considerable longer lived than the worm transmission mechanisms of the types heretofore employed and is exceptionally quiet in its action.

I wish it understood that the invention is not limited to any specific construction, arrangement or form of the parts, as it is capable of numerous modifications and changes without departing from the spirit of the claims.

Having thus described my invention, what I claim as new, and desire to secure by Letters Patent, is,—

1. In a power transmission mechanism, a drive worm, a plurality of members arranged in endless chain form and each being engaged and driven during a predetermined portion of its movement by the worm, means guiding the movements of the members, and means engaged by the members intermediate the ends of a flight thereof and driven thereby.

2. In a power transmission mechanism, a pair of axially spaced driven elements, a drive worm disposed intermediate the elements, and means comprising a plurality of members successively movable into simultaneous engagement with both the worm and the elements and operable by the worm to impart rotation to the elements.

3. In a power transmission mechanism, a drive worm, a pair of driven elements, means comprising a plurality of members arranged in endless chain form and successively movable into engagement with the worm and driven thereby, said blocks having simultaneous engagement at spaced points thereon and at opposite sides of the worm with the pair of elements to impart rotation thereto when the blocks are moved, and means forming a guide for the chain means.

4. In a power transmission mechanism, a drive worm, a plurality of blocks arranged in endless chain form and successively engaged and driven by the worm, each block having a plurality of rack sections aligning with like rack sections of adjoining blocks, and a plurality of gears engaged and driven at opposite sides of the worm by respective rack sections of the blocks when the blocks are moved.

5. In a power transmission mechanism, a drive worm, a plurality of members arranged in endless chain form and successively engaged and driven by the worm, means guiding the movements of the members, and a spur gear engaged and driven by the members with the pitch line of the gear at the point of engagement of the members therewith in the center line of applied force of the worm on the members.

6. In a power transmission mechanism, a drive worm, a driven gear, means comprising a plurality of members successively movable into engagement with the worm to drive one from the other, the pitch line of engagement of the members with the gear being in the center line of applied force of the worm on the members.

7. In a power transmission mechanism, a drive worm, a pair of driven gears, means comprising a plurality of members successively movable into engagement with and driven by the worm and each forming a cross connection between the gears when in engagement with the worm to drive the gears from the worm, and means forming a guide for the first means.

8. In a power transmission mechanism, a drive worm, a guide means, an endless chain having a plurality of sections in thrust contact one with another and guided for movement by said means, the chain sections having threaded worm receiving portions which successively move into engagement with and are driven by the worm, and means successively engaged by the chain sections at opposite sides of the worm axis and driven thereby with the center line of engagement of the sections with the means being substantially in the center line of applied force of the worm on the sections.

9. In a power transmission mechanism, a drive worm, a guide means, a plurality of block members arranged in endless chain form and guided by said means with a straight portion of their movement lengthwise of the worm and adjacent thereto, the blocks having worm encompassing portions which successively move into engagement with and are driven by the worm, said blocks each having a plurality of rack sections spaced transversely of the worm axis, and a plurality of gears successively engaged by respective rack sections of the blocks and driven thereby.

10. In a power transmission mechanism, a guide means, a plurality of abutting block sections arranged in endless chain form and guided for endless movement by said means, pivot pins disposed between adjacent faces of the blocks, rolls carried by the pin ends for engagement with said means to guide the movements of the block, a drive worm successively engaging and driving said blocks, and means engaged and driven by the blocks.

11. In a power transmission mechanism, a drive worm, a plurality of block members having internally threaded recesses for engagement with at least half of the worm transversely thereof, and elements simultaneously engaged by each block member at opposite sides of the worm and driven by the members.

12. In a power transmission mechanism, a drive worm, a plurality of successive block members each adapted to have threaded engagement with at least half of the worm transversely thereof and having a rack section at each side of its worm receiving recess, and gears at opposite sides of the worm engaged and driven by the respective rack sections of successive block members when moved by the worm.

13. In a power transmission mechanism, a housing, a worm shaft and a driven shaft mounted therein in angular relation, a pair of gears carried by the driven shaft, one at each side of the worm shaft, a plurality of blocks guided in endless chain form by the housing for movements in the axial plane of the worm shaft and each having threaded engagement with the worm and driving engagement with each gear at opposite sides of the worm during a predetermined portion of the block travel.

14. In a power transmission mechanism, a worm, a pair of driven gears one at each side of the worm, and a plurality of block members adapted to be driven by the worm and to impart rotation to the gears, each block member being of U-form to straddle the worm and having its legs provided at the outer sides thereof with lateral extensions forming gear engaging racks.

15. In a power transmission mechanism, a drive worm, a plurality of blocks forming an endless chain guided to cause the blocks to have a portion of their movement longitudinal to the worm in threaded engagement therewith, means guiding the movement of the blocks, and a pair of driven members disposed intermediate of and in spaced relation to the ends of movement of the blocks lengthwise of the worm and engaged by the blocks while in engagement with the worm to impart rotation from the worm to the driven members, said members being axially spaced transversely of the worm and disposed at opposite sides thereof.

16. In a power transmission mechanism, a drive worm, two driven members with their axes coincident at one side of the worm at an angle to its axis, the side of the worm which is adjacent to the member axis being in a line which is parallel to said axis and within the periphery of the driven members, a plurality of cross bars arranged in successive endless order and each at a predetermined point in its movement having simultaneous engagement with both the worm and the members to effect a driving of the members from the worm, and means guiding the course of movement of the cross bars.

In testimony whereof I have hereunto signed my name to this specification.

WILLIAM EMIL BOCK.